United States Patent
Muska 3,936,631
Feb. 3, 1976

[54] OPTICAL FIBER POWER TAP

[75] Inventor: Willis Martin Muska, Little Silver, N.J.

[73] Assignee: Bell Telephone Laboratories, Incorporated, Murray Hill, N.J.

[22] Filed: Nov. 11, 1974

[21] Appl. No.: 522,518

[52] U.S. Cl.................. 250/227; 250/216; 350/96 C
[51] Int. Cl.²............................................ G02B 5/14
[58] Field of Search........... 250/227, 216; 350/96 R, 350/96 C, 96 B, 96 WG

[56] References Cited
UNITED STATES PATENTS

| | | | |
|---|---|---|---|
| 3,045,223 | 7/1962 | Kapany et al.................. | 250/227 X |
| 3,058,021 | 10/1962 | Dunn............................... | 250/227 X |
| 3,350,654 | 10/1967 | Snitzer............................ | 250/227 X |
| 3,412,255 | 11/1968 | Krieger........................... | 250/227 |
| 3,508,589 | 4/1970 | Derick et al. ................. | 350/96 B X |
| 3,777,149 | 12/1973 | Marcatili........................ | 250/227 X |

*Primary Examiner*—Walter Stolwein
*Attorney, Agent, or Firm*—Thomas C. O'Konski; Wilford L. Wisner

[57] ABSTRACT

There is disclosed an arrangement for tapping signal power from an optical fiber waveguide without requiring that the fiber be terminated or broken. An intermediate length of a fiber waveguide from which all or most of the outer cladding has been removed is sandwiched between first and second dielectric bodies, each illustratively in the form of a circular disk. The first body, which serves to couple optical power out of the fiber, is formed of a relatively compliant dielectric material, such as a soft plastic, having an index of refraction approximately equal to, or greater than, that of the outer cladding of the fiber. The second body is formed of a relatively hard dielectric material, such as a glass or hard plastic, having an index of refraction less than that of the first body. The two dielectric bodies and the fiber are placed in a specially designed holder and forced together so that the fiber deforms the first body providing a large area of contact therewith. A photodetector disposed adjacent to the first body detects the power coupled out of the fiber, converting it to a representative electrical signal suitable for utilization. The holder serves to maintain the proper pressure and alignment among the two dielectric bodies, the fiber and the photodetector during the tapping process. In a modified embodiment of the fiber tap, the second dielectric body is provided with a rounded surface which forces the fiber to bend into a radius sufficient to cause power to radiate out of the inner core of the fiber into the outer cladding. The latter embodiment can thus tap optical power from a clad fiber without requiring that all or most of the fiber cladding be removed therefrom in the vicinity of the tap.

11 Claims, 7 Drawing Figures

OPTICAL FIBER POWER TAP

RELATED APPLICATION

This application is related to the concurrently filed application of J. E. Goell, T. Li and myself (Case 12-10-2), Ser. No. 522,577, which is assigned to the assignee hereof.

BACKGROUND OF THE INVENTION

This invention relates to optical fiber communication systems and, more particularly, to an arrangement for tapping signal power from an optical fiber waveguide without requiring that the fiber be terminated or broken.

Rapid progress has been made in the past few years in the design and fabrication of optical fiber waveguiding structures. There are now available several different fiber structures which are capable of transmitting large quantities of information via modulated optical waves or pulses with transmission losses as low as two decibels per kilometer. It is expected that some day such fibers will replace, at least in part, the wire pairs, coaxial cables and metallic waveguides now used conventional communication systems. The advantages of fiber systems over conventional systems include the small physical size and light weight of the fiber waveguides, the broad bandwidth capabilities which afford flexiblity in the selection of a bandwidth to be utilized in any given system, the non-conductive, noninductive properties of the fiber waveguides, and the potentially low cost of fiber materials and fabrication. The prospects of future use of the fiber systems are indeed wide ranging, and continue to expand.

The earliest implementation of fiber systems is likely to involve multi-terminal information transfer over short distance optical fiber links using light-emitting diodes, which have now been developed to the point of having sufficiently long operating lives, as the signal source. Because of the light weight and the immunity to electromagnetic interference of fiber systems, fiber optical data bus links have been proposed for the transmission of control and intercom signals on board aircraft and ships. Other potential applications include interoffice trunks, such as those interconnecting telephone central offices within a city, "on-premise" distribution links within a building or between adjacent buildings, and data bus links in computer or industrial control systems.

In the longer range future, fiber systems are likely to be used for the high capacity transmission of digital information over long distance fiber links, with lasers as the signal source. Intercity telecommunication links may thus some day be provided using optical fibers. It appears likely that repeater spacings of several kilometers or more and information transmission rates in the gigabit range will become technically feasible with such systems.

Whatever the application, it is clear that arrangements will be required for extracting signal wave information from the optical fiber waveguides. To monitor and control the transmission through a fiber link, for example, it may be required to sample the signal propagating through the individual fiber waveguides periodically along the link. Optical data bus links will require that signals be extracted for utilization at numerous selected points along the link. In most instances, it would be desirable if a portion of the signal propagating through the fiber could be tapped therefrom without breaking or terminating the fiber. Fiber terminations can add unwanted optical losses to the system, and would unfavorably increase the need for highly precise fiber splicing and interconnecting arrangements.

In the concurrently filed application of J. E. Goell, T. Li and myself, Ser. No. 521,577, assigned to the assignee hereof, there is disclosed a variety of arrangements for tapping signal power from an intermediate length of an optical fiber waveguide without requiring that the fiber be terminated or broken. In each illustrative embodiment of the optical fiber energy tap disclosed in the cited Goell et al application, optical power is coupled out of the fiber by a dielectric body disposed in a coupling relationship with the fiber, and is converted to a representative electrical signal by a photodetector disposed adjacent to the dielectric body. Claimed in the Goell et al application is the generic concept and structure of the optical fiber power tap, as well as various illustrative embodiments thereof which were collectively devised by Goell, Li and myself. Also disclosed therein, and dominated thereby but not specifically claimed therein, is an improved version of an optical fiber power tap which was independently devised by me. This improved version of the optical fiber power tap is specifically disclosed and claimed herein.

SUMMARY OF THE INVENTION

In accordance with an illustrative embodiment of my present improvement invention, an optical fiber power tap is provided in which an intermediate length of an optical fiber waveguide from which all or most of the cladding has been removed is sandwiched between first and second dielectric bodies. The first body, which serves to couple optical power out of the fiber, is formed of a relatively compliant dielectric material, such as a soft plastic, having an index of refraction approximately equal to or greater than that of the cladding of the fiber. The second body is formed of a relatively hard dielectric material, such as a glass or hard plastic, having an index of refraction less than that of the first body. The two dielectric bodies with the fiber disposed between them are placed in a specially designed holder and forced together, so that the fiber deforms the relatively compliant first body, providing a large area of contact therewith. The first body can thus couple a portion of the optical power from the fiber. A photodetector disposed adjacent to the first body detects the power coupled from the fiber, converting it to a representative electrical signal suitable for utilization. The holder is designed to protect, and to maintain, the proper pressure and adjustment among the respective tapping elements during handling and use of the tap.

In accordance with another illustrative embodiment of the invention, the above-described embodiment is modified so as to be able to tap optical power from a clad fiber waveguide without requiring that all or most of the outer cladding be removed in the vicinity of the tap. The second relatively hard dielectric body is provided with a rounded surface which, when forced against the fiber, causes the fiber to bend into a radius sufficient to cause a portion of the power propagating therein to radiate out of the inner core into the outer cladding. The power can then be extracted from the outer cladding of the fiber by the first dielectric body.

In accordance with still another illustrative embodiment of the invention, the specially designed holder for the respective tapping elements of the fiber tap is modified so as to allow adjustment of the pressure exerted on the two dielectric bodies and in that way to allow the amount of power tapped from the fiber to be adjusted.

BRIEF DESCRIPTION OF THE DRAWING

The various features and advantages of the invention will be better understood from the following detailed description taken in conjunction with the accompanying drawing in which.

Figure 1:
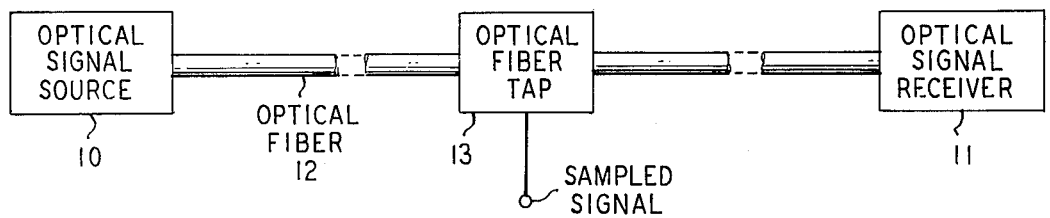
FIG. 1 is a block diagrammatic illustration of an optical fiber communication system including an optical fiber tap embodied in accordance with the invention.

The figures of the drawing are not necessarily drawn to scale or to relative dimensions.

DETAILED DESCRIPTION

FIG. 1 of the drawing shows, in block diagrammatic form, a typical optical communication system comprising an optical signal source 10, such as a laser or light-emitting diode, an optical receiver 11 and an optical fiber transmission link 12 illustratively comprising a single optical fiber waveguide coupling the source to the receiver. Fiber 12 may have a length anywhere from a few meters to several kilometers, depending upon the particular application of the system. The present invention relates to an improved version of the optical fiber power tap shown as element 13 in FIG. 1. The illustrative embodiments of fiber tap 13 described in detail hereinbelow are structured so that they can be attached, as shown, at any intermediate position along fiber 12 of the illustrated system for the purpose of sampling or monitoring the signal propagating therethrough. Each embodiment is structured so that a portion of the propagating signal can be tapped from the fiber without requiring that the fiber be terminated or broken.

Although only one fiber waveguide and one fiber tap are shown in FIG. 1, it should be noted that the transmission link could include a plurality of fiber waveguides. Optical fiber taps, like fiber tap 13 could then be attached to each fiber in the link, or to selected ones, as desired.

Figure 2A:
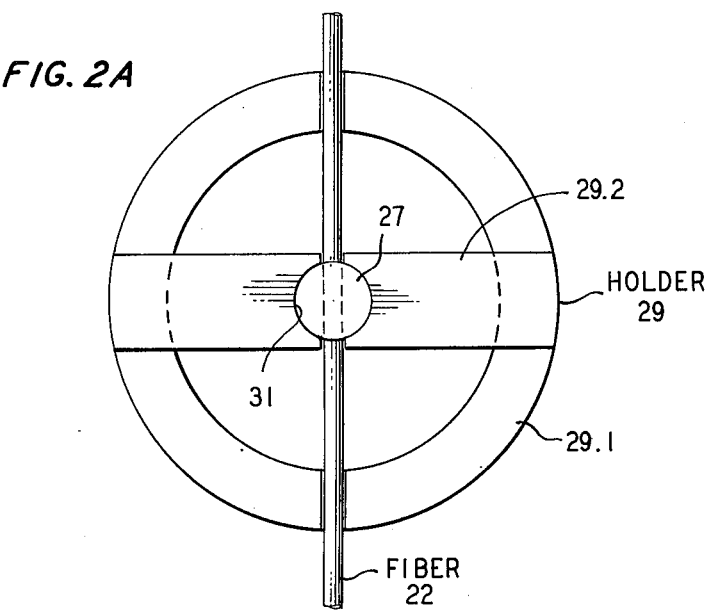
FIG. 2A is a top view and FIG. 2B is an exploded side view of an illustrative embodiment of the fiber tap of the invention.
Figure 2B:
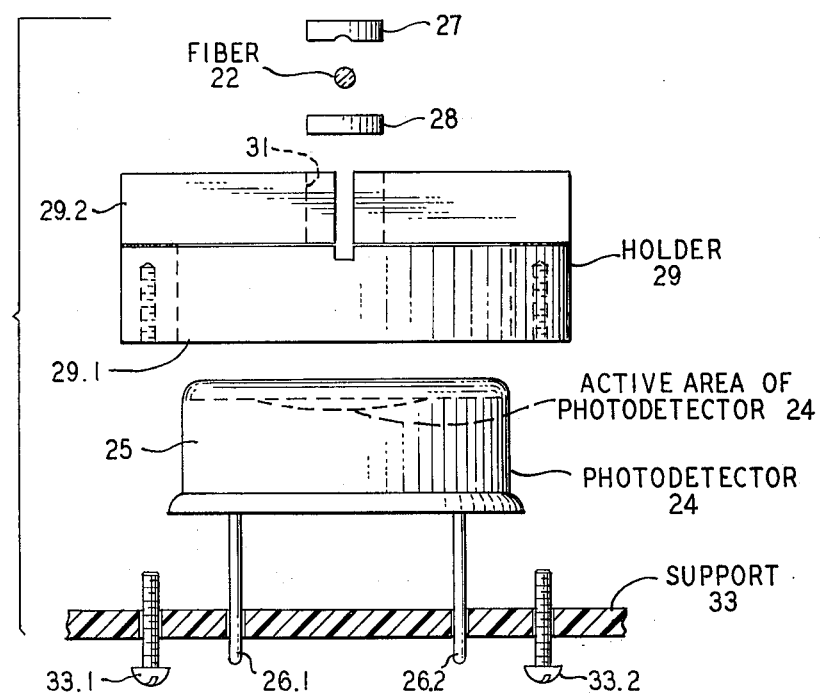

FIGS. 2A and 2B show top and side views, respectively, of an illustrative embodiment of fiber tap 13 of the invention. Fiber 22 is illustratively an intermediate length of a fiber waveguide of the type that might be used in the optical communication system. As is well known, the typical fiber waveguide includes a low optical loss core surrounded by a cladding of lower refractive index than that of the core. The index of refraction of the inner core may be uniform, or radially graded with the maximum index along the central axis of the core. In each case, the optical power is generally confined within the inner core of the fiber, with little power in the outer cladding. To provide the desired tap in this embodiment, all or most of the outer cladding is accordingly removed from the limited length of fiber 22 shown in FIG. 2A. For those fibers in which the cladding is formed of a plastic material, removal thereof can be accomplished simply by stripping the cladding from the core with a suitably sharp implement, such as a razor blade, or by chemically stripping the cladding from the core with a suitable solvent which dissolves the cladding material. For those fibers in which the cladding is formed of a glass material, fused silica or other inorganic material, removal thereof would typically be accomplished by precisely grinding the cladding to expose the core, or at least to have a thickness less than about three optical wavelengths. A fiber grinding technique and arrangement suitable for this purpose is disclosed in U.S. Pat. No. 3,777,149, issued to E. A. J. Marcatili on Dec. 4, 1973, where it is used in the fabrication of signal detection and delay equalization apparatus for an optical fiber.

As can be seen more clearly in the exploded side view of FIG. 2B, the stripped portion of fiber 22 is disposed between dielectric bodies 27 and 28, each of which is illustratively in the shape of a circular disk having a cross-sectional area larger than the cross-sectional area of the fiber. Disk 28, which serves to couple optical power out of fiber 22 to photodetector 24, is formed of a dielectric material having a refractive index which is approximately equal to, or greater than, that of the outer cladding of fiber 22.

The material of coupling disk 28 is also preferably substantially more compliant than the material of either fiber 22 or disk 27, so that it can be deformed under pressure. Many plastic materials have refractive indices comparable to, or in excess of, the materials commonly employed in the fabrication of fiber waveguides (e.g., glasses, fused silica, etc.), and are also relatively compliant. Plastic materials are thus preferred for coupling disk 28.

By forcing disks 27 and 28 together, fiber 22 is made to deform the upper surface of disk 28, and to provide a relatively large area of contact therewith. Disk 27, which was indicated to be formed of a relatively hard material, is also preferably formed of a dielectric material, such as a glass or relatively hard plastic material. It, however, has a refractive index which is less than that of the cladding material of fiber 22, and is in all cases less than the refractive index of disk 28, so that the majority of the power coupled out of the fiber is coupled out by disk 28. A groove is preferably provided along the lower surface of disk 27 to restrict lateral movement of fiber 22 when the two disks are forced together.

As long as the material of coupling disk 28 is selected to have a refractive index which is approximately equal to, or greater than, the refractive index of the material of the outer cladding of fiber 22, power will be coupled out of the fiber by disk 28. In general, the amount of power coupled out of the fiber by disk 28 increases as the index of refraction of the disk is increased, and as the coupling length between fiber 22 and disk 28 is increased. To provide a relatively low power tap, for example, one which extracts the order of one per cent of the total power from fiber 22, the index of refraction of disk 28 would typically be selected to be within about ± 20 per cent of the index of refraction of the fiber cladding material. Relatively high power taps, which extract larger fractions of the total power from fiber 22 (e.g., 50 per cent of the power), preferably employ a coupling disk 28 of refractive index which exceeds that of the fiber core material, and may even exceed that of the fiber core material. Thus, the particular index of refraction selected for coupling disk 28 in the embodiment depends upon the type of tap desired, but is in all cases in the range of about 0.8 times the fiber cladding index and greater. The typical coupling length between fiber 22 and disk 28 is of the order of one millimeter.

Photodetector 24 may be any one of a variety of conventional photodetectors designed to respond to the wavelength of the optical wave propagating through fiber 22, which is illustratively about one micrometer. The article by H. Melchoir et al in Volume 58 of the *Proceedings of the IEEE*, pages 1466–1486 (October 1970) describes a number of alternative high sensitivity photodetectors suitable for optical communication systems use. Illustratively, photodetector 24 is a solid state photodiode of the p-i-n form, such as the SGD 100A, 100 mil diameter, silicon p-i-n photodiode manufactured and offered commercially by E.G. and G., Inc. As shown in FIG. 2B, the photodetector illustratively includes a metal outer casing 25, an external lead 26.1 which is electrically grounded, and an output lead 26.2 from which an electrical signal corresponding to the detected optical signal is taken. Preferably, the glass window protecting the active area of the photodiode is removed so that coupling disk 28 can be disposed in direct contact therewith.

For a relatively low power tap, it may be preferable to use an avalanche photodiode for photodetector 24. Avalanche photodiodes combine the detection of optical signals with an internal amplification of the photodiode, and thus are generally more sensitive than the various non-avalanching photodiode structures.

To maintain proper alignment, the assembly of fiber 22, disks 27 and 28 and photodetector 24 is disposed in a specially designed holder 29. Holder 29 is preferably formed of a durable material such as a metal (e.g., brass). It includes two pieces, an annularly shaped base 29.1 and a rectangular cross bar 29.2, which is fixed (e.g., hard soldered) diametrically across and on top of base 29.1. The inner diameter of base 29.1 is selected so that photodetector 24 can be inserted, and preferably fixed, therein. Base 29.1 and bar 29.2 are cut (e.g., sawed) perpendicular to the long dimension of the bar, as shown in the figures, to provide a centrally disposed slot therein suitable for holding fiber 22 in place. The slot is illustratively cut completely through bar 29.2, but only partially through base 29.1 of holder 29. A hole 31 is drilled through the central portion of bar 29.2 of a diameter sufficient to accommodate disks 27 and 28. Illustratively, the inner diameter of hole 31 is such that it provides a tight fit for disk 27, and in that way prevents movement of disk 27 out of the hole after it is forced therein. Alternatively, disk 27 can be glued or otherwise fixed in holder 29. Holder 29 is illustratively fixed to a suitably perforated support 33 by screws 33.1 and 33.2.

Figure 3A:
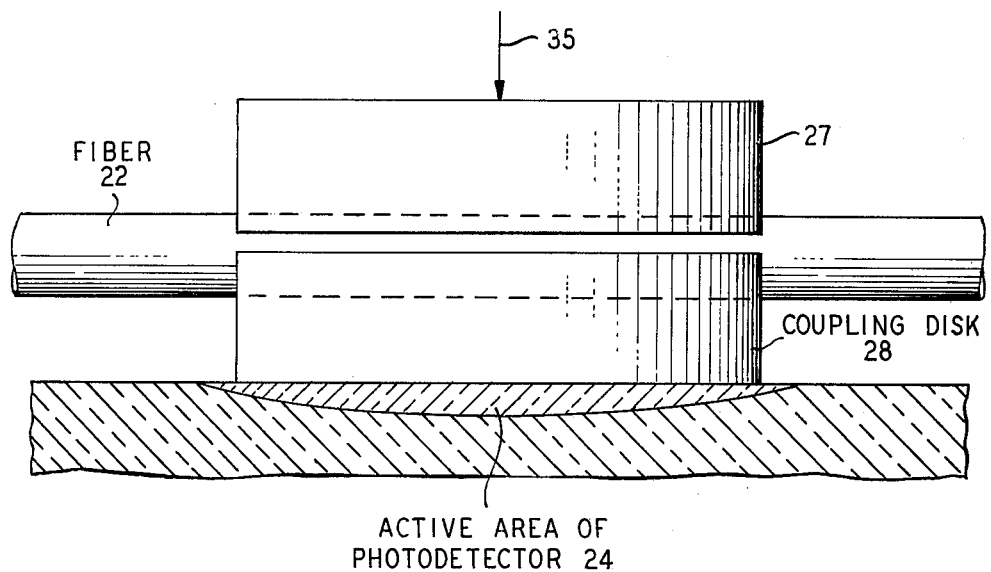
FIGS. 3A and 3B are orthogonal side views which show in greater detail the positioning of the respective tapping elements in the embodiment of FIGS. 2A and 2B.
Figure 3B:
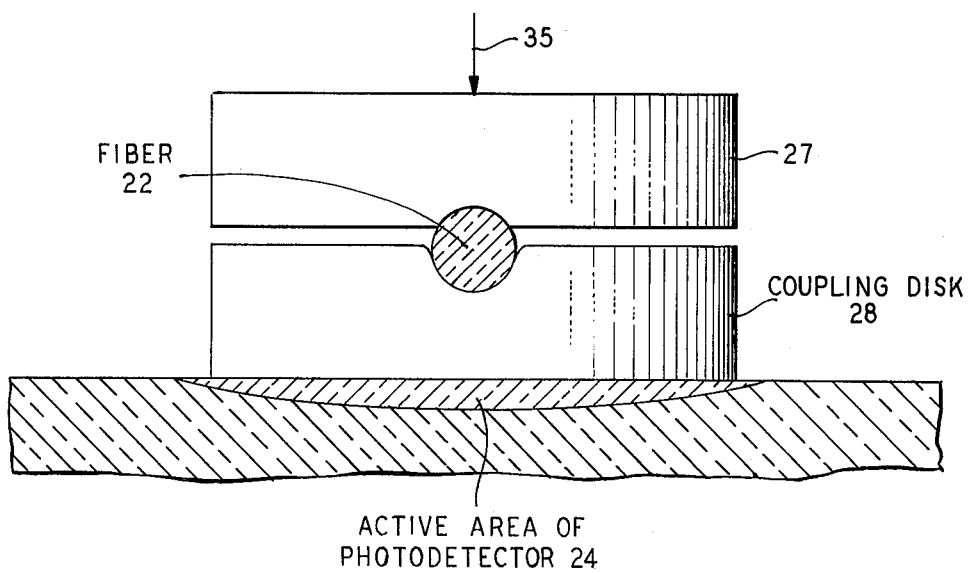

FIGS. 3A and 3B are magnified views illustrating the relative positioning of disks 27 and 28, fiber 22 and photodetectors 24 when inserted in holder 29. To provide a clearer picture of the respective elements, holder 29 is not shown in these figures. It is noted that coupling disk 28 is disposed directly over the active area of photodetector 24 (photodetector 24 is shown in partial cross-section in these figures). The groove provided in the lower surface of disk 27 assures that fiber 22 is also accurately disposed over the active area of photodetector 24. The downward pressure on disk 27, illustrated by arrow 35, causes fiber 22 to deform the relatively compliant coupling disk 28, and forces coupling disk 28 against photodetector 24. Good optical contact is thus assured between fiber 22 and coupling disk 28, as well as between coupling disk 28 and photodetector 24. This good optical contact and accurate alignment of the respective elements is maintained during handling and use of the fiber tap by holder 29.

As an example, if the cladding of fiber 22 is formed of a material such as fused silica ($n = 1.46$), a suitable material for coupling disk 28 is polyvinylchloride (PVC). PVC has a refractive index of about 1.54, and can be made to be substantially more compliant than fused silica (i.e., Young's modulus for highly plasticized PVC can be as low as 1000 to 2000 pounds per square inch (psi), while Young's modulus for fused silica is about $10^7$ psi). Disk 27 could be formed of a teflon copolymer or tetrafluoroethylene and hexafluoropropylene (FEP), which has a refractive index of about 1.33 and a modulus of about $5 \times 10^4$ psi. The groove in the lower surface of disk 27 could then be provided by embossing the disk at an elevated temperature with a suitably sized fiber or wire.

Although clad fiber waveguides are at present the most likely candidates for use in future optical communication systems, other fiber waveguiding structures are possible, such as unclad (i.e., air clad) fibers, and single material fibers of the type disclosed in Volume 52 of *The Bell System Technical Journal*, pages 265–268 (February 1973). Whatever the fiber structure, the coupling disk of the fiber tap, to provide the desired coupling relationship, should be disposed in contact with, or at least within about three optical wavelengths of, the portion of the fiber in which the optical power is confined. Thus, to tap unclad fibers, dielectric disk 28 is simply disposed in contact with the exterior surface of the fiber. To tap a single material fiber, coupling disk 28 would illustratively be disposed in contact with the enlarged central region of the fiber through which the optical power is propagated. In the latter case, removal of the outer tubing protecting the enlarged central guiding region of the fiber may be required in the vicinity of the tap. In either case, power is coupled out of the fibers if the index of refraction of the coupling disk equals, or exceeds the index of the medium surrounding the guiding portion of the fiber, which is typically air ($n \simeq 1.0$). Again, the amount of power coupled out of the fiber increases as the index of refraction of the coupling disk is increased.

Fiber 22 was illustratively indicated hereinabove to be a clad fiber waveguide from which all or most of the outer cladding had been removed along the limited length of the fiber in contact with the coupling disk of the tap. As noted hereinabove, stripping the cladding from a plastic clad fiber is typically a relatively simple task. However, stripping the cladding from a fiber in which the cladding is a glass, fused silica or some other similar inorganic material generally requires the use of a precision grinding technique, such as that employed in U.S. Pat. No. 3,777,149. Under certain circumstances, such precision techniques can be too time-consuming and, in general, impractical, especially when practiced in the field by service and maintenance personnel. The following embodiment of the fiber tap is preferred for tapping clad fiber waveguides in that it does not require that the cladding be stripped from the fiber before the tap can be made.

Figure 4:
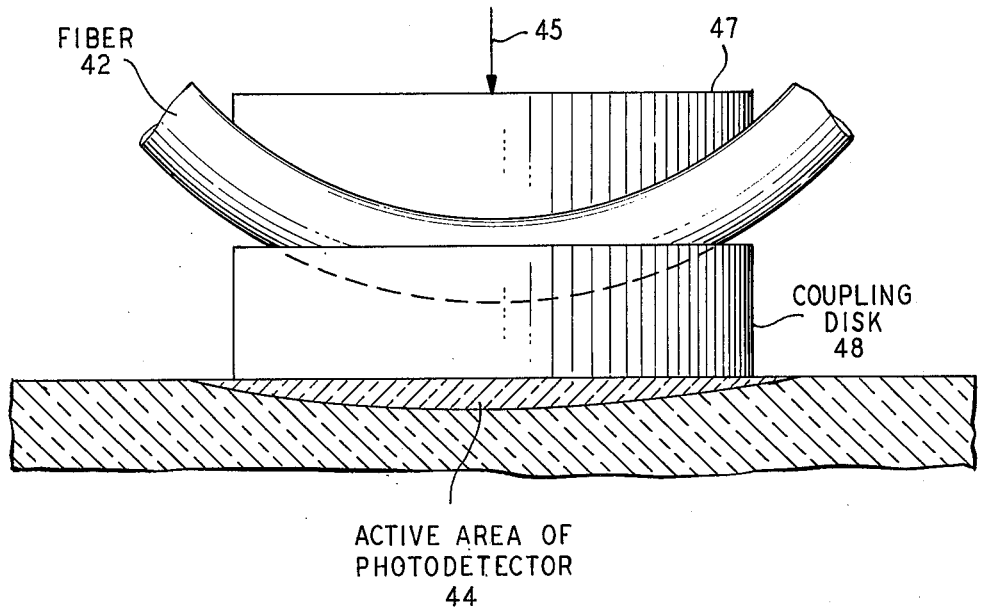
FIG. 4 is a side view of a modified version of the embodiment of FIGS. 3A and 3B useful for tapping clad optical fiber waveguides without removing all or most of the cladding therefrom.

FIG. 4 is a side view of a modified version of the embodiment of FIGS. 2A through 3B useful for tapping clad fiber waveguides without removing all or most of the cladding from the fiber in the vicinity of the tap. Again, holder 29 is not shown in FIG. 4 to provide a clearer picture of the respective tapping elements. Photodetector 44 (shown in partial cross-section) is illustratively identical to photodetector 24 of FIGS. 2A through 3B. Fiber 42 is a clad of fiber waveguide including an inner core of a low optical loss material surrounded by a lower refractive index outer cladding. Coupling disk 48 is formed of a relatively compliant dielectric material (e.g., polyvinylchloride) having a refractive index approximately equal to, or greater than, the outer cladding of fiber 42. Disk 47 is formed of a relatively hard dielectric material (e.g., Teflon FEP) of a refractive index lower than that of coupling disk 48. In order for coupling disk 48 to be effective in extracting power from fiber 42, disk 47 is provided with a lower surface of a rounded cross-section. Thus, when disk 47 is forced against fiber 42 in the direction of arrow 45, fiber 42 is forced to bend conforming to the rounded surface of disk 47. The resulting bend in fiber 42 causes a portion of the optical power propagating in the inner core of the fiber to radiate into the outer cladding from which it can be extracted by coupling disk 48, and eventually detected by photodetector 44. Adjustment of the tapped power can be achieved either by varying the pressure applied to disk 47 in the direction of arrow 45, or by replacing disk 47 with another similar disk having a rounded surface of a different radius of curvature.

Figure 5:
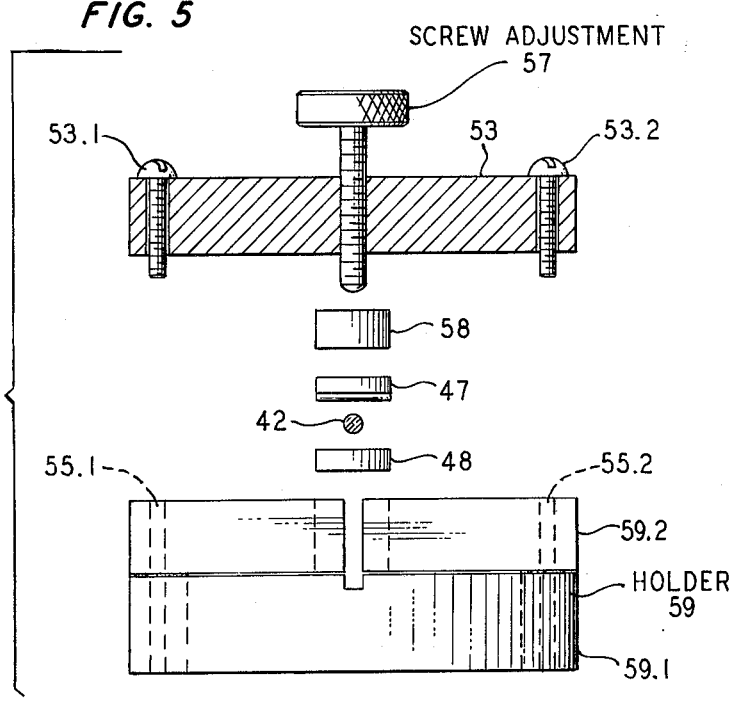
FIG. 5 is an exploded side view of a modified version of the embodiment of FIGS. 2A and 2B designed for adjusting the amount of optical power tapped from a fiber waveguide.

FIG. 5 is an exploded side view of an arrangement which can be used to adjust the pressure exerted on disk 47 of FIG. 4 and, in turn, to adjust the amount of power tapped from fiber 42. Holder 59 of FIG. 5 includes an annular base 59.1 and a cross bar 59.2, and is illustratively identical to holder 29 of FIG. 2B with the exception of the two threaded holes 55.1 and 55.2 provided at opposite ends of the upper surface of bar 59.2. A clamping bar 53 illustratively formed of a metal, such as brass, is disposed on top of bar 59.2 of holder 59 and fastened thereto by screws 53.1 and 53.2. Bar 53 includes a centrally disposed threaded hole in which screw adjustment 57 is inserted and can be turned. Spacer 58 is spaced between the end of screw adjustment 57 and disk 47 to avoid damage to the latter during tightening of the screw adjustment. By tightening screw adjustment 57, downward pressure is exerted on disk 47. As the downward pressure is increased (e.g., as screw adjustment 57 is further tightened), the optical power tapped from fiber 42 is increased, at least up to a point where fiber 42 conforms completely and continuously to the lower rounded surface of disk 47. After that point, there is generally little change in the tapped power with increased downward pressure. As noted above, however, further adjustment of the tapping can be achieved by replacing disk 47 with one of a different (e.g., smaller) radius of curvature.

It should be noted that the arrangement shown in FIG. 5 can also be used with the embodiment of FIGS. 2A through 3B to maintain the desired downward pressure on disk 27 shown in those figures. It has also been found that there is a limited range of adjustment available by tightening screw adjustment 57 even if a flat surfaced disk such as disk 27 is used. The increase in the tapped power under such circumstances is attributed to the increasing area of contact between fiber 22 and the relatively compliant coupling disk 28 resulting from the increasing downward pressure exerted on disk 27.

It is to be understood that the above-described embodiments are illustrative of but a few of the many possible specific embodiments which can represent applications of the principles of the invention, as defined by the appended claims.

What is claimed is:

1. An arrangement for tapping optical power from an intermediate portion of an optical fiber waveguide without requiring that the fiber be terminated or broken, said fiber including a guiding region in which the optical power is essentially confined, and including a cladding medium surrounding said guiding region, said arrangement being characterized by a first body of dielectric material having a first major surface disposed in a coupling relationship to an intermediate length of said fiber to couple optical power out of said guiding region of said fiber, said first body having an index of refraction which is approximately equal to or greater than the index of refraction of the medium surrounding said guiding region of said fiber and is selected to couple only a minor portion of the optical power propagating in said fiber waveguide guiding region toward a surface of said dielectric body laterally offset from said guiding region, the material of said first body being substantially more compliant than the material of said fiber;

adjustable means for pressing said fiber against said first body to provide an area of contact between said first surface of said first body and said intermediate length of said fiber, comprising a second body of dielectric material having an index of refraction less than that of said first body; and a photodetector contacting said laterally offset surface of said dielectric body and including an active area responsive to the wavelength of the optical signal to be propagated through said fiber, said active area of said photodetector being oriented to intercept the optical power coupled out of said guiding region of said fiber by said first body.

2. The tapping arrangement of claim 1 in which said guiding region of said fiber comprises an inner core formed of a low optical loss material, said medium surrounding the guiding region comprising an outer cladding of lower refractive index than that of said inner core; and said first body has an index of refraction greater than about 0.8 times the index of refraction of said outer cladding of said fiber.

3. The tapping arrangement of claim 2 in which said outer cladding of said fiber is at least partially removed along said intermediate length of said fiber to have a thickness less than three wavelengths of the optical signal to be propagated through said fiber; and said intermediate length of said fiber is disposed in contact with said first major surface of said first body.

4. The tapping arrangement of claim 2 in which said second body includes a major surface disposed in contact with said fiber and having a groove therein of dimensions comparable to those of said fiber and sufficient to restrict movement of said fiber relative to said second body.

5. The tapping arrangement of claim 2 in which
said intermediate length of said fiber is bent into a radius R sufficient to cause a selected minor portion of the optical power to be propagated therein to radiate out of said inner core into said outer cladding; and
said cladding of said intermediate length of said fiber is disposed in contact with said dielectric body.

6. The tapping arrangement of claim 5 in which
said second body of said pressing means includes a major surface disposed in contact with said fiber of a rounded cross-section such that, when said second body is pressed against said fiber, said fiber is forced to bend into a radius sufficient to cause a portion of the optical power to be propagated therein to radiate out of said inner core into said outer cladding out of which the power can be coupled by said first body.

7. The tapping arrangement of claim 6 including means for adjusting the pressure exerted by said second body on said fiber to adjust the amount of optical power coupled out of said outer cladding by said first body.

8. The tapping arrangement of claim 1 in which said first body is formed of a plastic material.

9. The tapping arrangement of claim 1 further including a holder for holding said fiber, said first and second dielectric bodies and said photodetector in their relative positions.

10. The tapping arrangement of claim 9 in which said holder comprises
an annularly-shaped base, said base having an inner cavity into which said photodetector can be inserted; and
a rectangular cross bar fixed diametrically across and on top of said base, said cross bar having a slot cut transversely through a central region thereof in which said fiber can be inserted and a hole cut through said central region thereof communicating with the active area of said photodetector and in which said first and second bodies can be inserted, said fiber being sandwiched between said first and second bodies, respectively, in the hole in said cross bar.

11. The tapping arrangement of claim 10 in which said holder further includes
a clamping bar fixed on top of said cross bar, said clamping bar including a threaded hole provided in a centrally disposed region thereof over the slot and hole in said cross bar; and
a screw adjustment capable of being turned in the threaded hole of said clamping bar, the pressure exerted on the second body being increased by tightening said screw adjustment into said clamping bar.

* * * * *